Figures 3, 4:
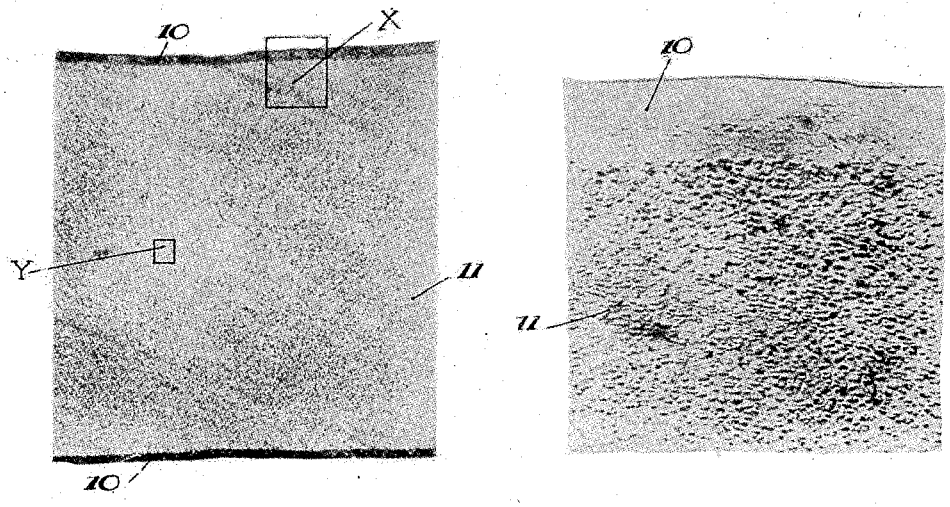

Feb. 20, 1945.        A. G. OLSEN ET AL        2,369,847
PREPARATION OF FLAVORING MATERIALS
Filed Dec. 6, 1941        2 Sheets-Sheet 1
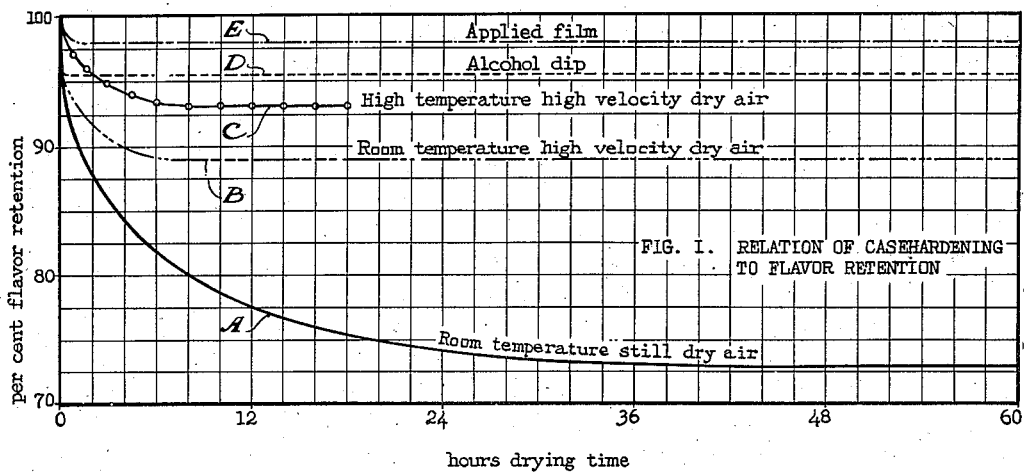
FIG. 1. RELATION OF CASEHARDENING TO FLAVOR RETENTION
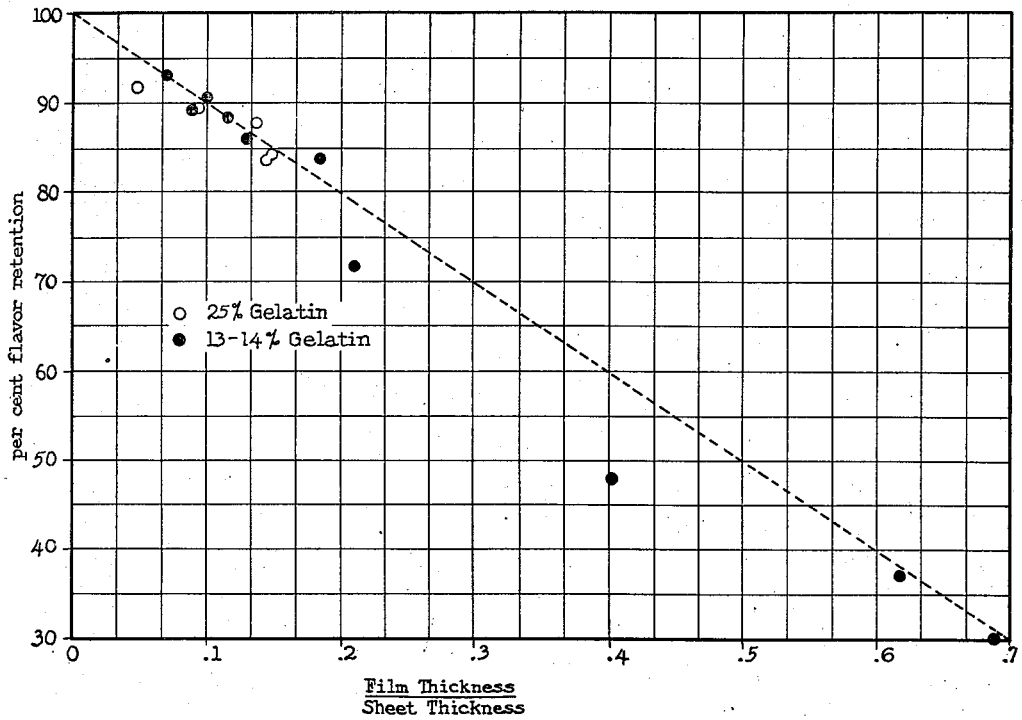
Fig. 2. Relation of $\frac{\text{Film Thickness}}{\text{Slab Thickness}}$ Ratio to Flavor Retention
Inventors
Aksel G. Olsen.
Edward Seltzer.
By Cameron, Kerkam + Sutton
Attorneys Patented Feb. 20, 1945

2,369,847

UNITED STATES PATENT OFFICE 2,369,847

PREPARATION OF FLAVORING MATERIALS

Aksel G. Olsen, Summit, and Edward Seltzer, Teaneck, N. J., assignors to General Foods Corporation, New York, N. Y., a corporation of Delaware Application December 6, 1941, Serial No. 421,988

14 Claims. (Cl. 99—140)

This invention relates to flavoring materials and is directed particularly to the preparation of dry flavoring materials, preferably in granular form, which contain volatile, water-immiscible flavoring substances in such form that their original freshness and intensity are retained over prolonged periods of time.

The reduction in intensity and often complete loss of volatile flavors during storage and distribution of food products to which they have been added, particularly dry products marketed in paperboard cartons, has been a long-standing problem. Efforts have been made to overcome it by various flavor-drying procedures, and some success has been attained with water-miscible substances of relatively low volatility such as fruit juices and fruit juice concentrates where, despite the loss of the volatile components of the flavor and aroma during drying, a non-volatile flavor body remains after drying. Thus it has been proposed that such substances be dried on a suitable absorbent base composed of powdered gelatin, sugar, starch, pectin or the like, or that they be incorporated, preferably with added sugars, in solutions of gelatin and the like which thereafter are dried and ground.

Quite a different problem, on the other hand, is presented by those flavoring substances consisting substantially or entirely of volatile water-immiscible constituents. Flavors of this type, of which common examples are oil of bitter almonds, lemon oil, lime oil, ionone, cassia oil, etc., do not dissolve to any appreciable extent in water, sugar syrups, gelatin or pectin solutions, and are substantially completely dissipated or volatilized in the course of ordinary drying procedures. Hence they cannot be handled by procedures such as those referred to above, and when used heretofore in dry products, such as gelatin desserts, pie fillings, prepared cake mixes, jelly powders and the like, they have merely been sprayed or otherwise spread over or absorbed on the other dry materials. Although much work has been done to improve packaging materials, this practice still requires the use of as much as four to ten times the amount of flavor actually needed in the product at the time of consumption in order to allow for the loss occurring during marketing. Even with this precaution, the rate of flavor loss is so great that such products are not infrequently entirely devoid of flavor when prepared for use by the consumer, unless stored and distributed without too much delay and under proper conditions.

In the field of gelatin desserts, it has been proposed to solve this problem by incorporating such volatile flavors in gelatin solutions prior to drying so as to produce flavored gelatin for use in such products. With the purpose of minimizing the great loss of flavor taking place during drying, the concentration of flavor in these solutions was kept low and it was proposed to increase the concentration of gelatin and dry as rapidly as possible which, with higher gelatin concentrations, was thought to necessitate drying in the form of very thin sheets. A recent example of such proposals is found in Epstein et al. Patent No. 2,258,567, dated October 7, 1941, according to which the gelatin concentration must be kept above an allegedly critical limit of 16%.

On the contrary, we have demonstrated that the gelatin concentration is not critical and has only a minor and unimportant effect on loss of flavor. Unless other factors are properly controlled as set forth hereinafter, the gelatin concentration may be raised to 16% or above and still the loss of flavor taking place during drying is so great that little or no economic advantage is obtained over the usual commercial procedure set forth above. Conversely, when other factors are properly controlled very high yields and correspondingly small losses are obtained with gelatin concentrations much less than 16% as pointed out hereinafter.

Moreover, in products of the type described in the above mentioned patent, the level of flavor remaining after drying is so low that they can not be added in small amounts as flavors to food products in general, but can be used only in gelatin food products to replace substantially or entirely the normal gelatin content thereof. Not only is the field of use of such proposed products thus restricted, but also practically all of the gelatin used in a commercial operation would have to be flavored. Such a procedure is impracticable where different flavors are used, partly on account of the difficulty of preventing contamination of flavors in factory operations but principally because of the necessity of blending gelatin from different lots and runs to produce a uniform product conforming to standard specifications in gel strength and other characteristics. For the above reasons such prior proposals, as far as we are aware, have never given sufficient promise of practical success to warrant their adoption in place of the usual commercial practice referred to above.

Accordingly, one of the objects of the present invention is to provide a novel method of preparing such volatile, water-immiscible flavoring substances in dry and, if desired, granular form such that loss of said flavors by volatilization during drying is substantially prevented.

Another object is to provide a novel flavoring material comprising a dry granular product containing a volatile, water-immiscible flavoring substance and constituting a flavor adapted for addition to any desired food products in small quantities as a substitute for the usual liquid flavor and to impart thereto the desired amount of flavor at the time of consumption without loss of flavor during storage and distribution.

A further object is to provide a novel method whereby such volatile flavors can be encapsulated in a suitable dry colloid such as gelatin in concentrations such that the resulting product can be used as a flavor substantially without imparting colloidal characteristics to or altering the colloidal properties of foods to which it is added and without materially interfering with the normal processing, manufacture or use of such foods.

We have found that when the surface of a colloid solution is provided during drying with a protective film, skin or membrane which is impervious to the flavor but not to the water, the loss of flavor during drying and conversely the proportion of the flavor retained in the dry product are directly dependent upon the ratio of the thickness of the dried surface layer at the time such protection becomes effective to the total thickness of the sheet or slab of dried colloid, the loss decreasing as the ratio decreases. Hence by controlling and properly correlating these two variables so as to provide a predetermined ratio, a dry product retaining the corresponding desired amount of flavor can be obtained. Since the ratio is decreased as the total thickness is increased, high flavor yields will result from increasing the slab thickness with respect to usual gelatin drying conditions instead of from decreasing it to obtain rapid drying as heretofore proposed. Although the drying time may be greatly extended by the increased thickness and the presence of the protective film, we have found that neither the rate of drying nor the total drying time has any material effect on loss of flavor once the protective membrane is established, and that while some loss of flavor may take place prior thereto, under proper conditions as set forth hereinafter 90% or more of the flavor can be retained in the dried colloid matrix.

Generally stated, we first preferably disperse the volatile water-immiscible flavoring substances in the form of discrete micro-droplets throughout a matrix of an edible hydrophilic colloid, as by emulsification, homogenization, or any other suitable procedure, and then dry the emulsion until enough water has been removed from the matrix to form a dry product. The matrix may comprise any edible, hydrophilic colloid which when dried is substantially impervious to the flavor, for example, gelatin, pectin, polyvinyl alcohol, the common gums, etc., and when dry is preferably comminuted before use in food products so as to form a dry granular product, the individual granules of which contain a plurality of separately encapsulated micro-droplets or globules of the volatile flavor. However, the dry product can be stored with or without comminution for long periods, and can be incorporated for long storage and distribution periods in dry food products such as those referred to above without any substantial loss of flavor from the encapsulated droplets.

We have found that substantially no loss of flavor from the emulsion takes place during drying after a film, membrane or skin such as described above is established over the drying surface or surfaces, although the drying time will be increased, as compared with normal drying procedures, since water can be removed only slowly through the protective film. The protective film on the emulsion can be provided in any suitable manner. For convenience in handling and to facilitate drying, the emulsion is preferably first formed into sheets or slabs on the surfaces of which the protective film is then established. Thus, there may be applied to the slabs sheets of suitable material permeable to moisture vapor but not to flavor, such as "Cellophane," polyvinyl alcohol, predried gelatin or other colloid, etc. On the other hand, a dried surface membrane or skin may be formed on the slabs by surface drying or case-hardening of the emulsion itself. For example, the surface of the emulsion may be treated initially with a suitable dehydrating or coagulating agent, such as alcohol, acetone, aluminum chloride, ether, etc. Alternatively, the protective film or skin may be formed by promoting rapid surface drying during the initial stage of the drying operation with consequent rapid formation of a thin skin of dried colloid. Thus, the emulsion may be subjected to a current of drying air moving at suitable velocity, the temperature and humidity of the air may be suitably adjusted to obtain rapid surface drying, etc. Whatever procedure is employed, however, the protective film should be established before, or as promptly as possible after, drying begins in order to minimize loss of flavor.

As indicated above, we have found that the loss of flavor which takes place in drying under the above conditions is directly proportional to the ratio of surface layer thickness to total dry thickness of the sheet or slab of encapsulated flavor. We have observed that substantially all the flavor lost in the brief period which may elapse before a protective membrane can be applied comes from the surface portion of the emulsion, and likewise that when the protective membrane is established by case-hardening of the emulsion itself, substantially all the flavor lost comes from the surface portion of the emulsion which is dried to form the membrane. As discussed in detail hereinafter, examination of the dried product shows that this surface portion comprises a substantially homogeneous layer of colloid practically entirely devoid of encapsulated flavor droplets, as distinguished from the remaining portion in which flavor droplets are uniformly and thickly dispersed in a sponge-like colloid structure. Since as mentioned above increased drying time has no effect on loss of flavor once the protective membrane is provided, the loss of flavor prior thereto accordingly depends entirely on the ratio of the thickness of this dried surface portion to the total dry thickness of the sheet. Accordingly the desired ratio and corresponding flavor yield can be obtained by adjusting and correlating the variables of skin thickness and total sheet thickness as described hereinafter.

We have found that the thickness of the dried surface layer varies somewhat with different methods of establishing the protective film. It tends to be less in the case of applied preformed membranes, if promptly applied, than in the case-hardening procedures referred to above, since in the latter case the protective membrane is formed entirely from the emulsion itself. Hence in casehardening rapid skin formation is desirable because it results in a thinner dried surface layer, and acceleration of skin formation by the use of dehydrating or coagulating agents is to be preferred for best results. Unless the total dry thickness is very small, however, such variations in the thickness of the dried surface layer exert only a minor effect on loss of flavor and good results are obtained with any method in which case-hardening is obtained reasonably promptly.

We have also found that with the same case-hardening conditions, higher colloid concentrations result in somewhat thinner protective films. Since there is less water in solutions of higher concentration, less water needs to be removed from the sheet or slab in order to provide a substantially dry surface layer and consequently protection against loss of flavor is obtained more quickly and the thickness of the skin is less. As pointed out above, however, such minor variations in film thickness do not greatly affect flavor yields except in the case of very thin sheets.

Further, it will be evident that for any given thickness of dried film the ratio of such thickness to the total slab thickness, and the loss of flavor as well, decrease as the total dry thickness increases. However, as the thickness is increased, the additional flavor yield obtained with each successive increment decreases and ultimately may not be sufficient to justify further increase in total drying time. Accordingly, greater slab thicknesses are desirable but only as long as the advantage of the higher flavor yields resulting therefrom more than offsets the disadvantage of the greater drying time. The desired total dry thickness of the sheet can be obtained by properly proportioning the wet thickness with regard to the concentration of colloid in the solution, since it depends on the amount of dry colloid in the sheet irrespective of the amount of water therein. It will be understood, however, that unless the skin thickness is very large, minor variations in total dry thickness do not greatly affect flavor yields.

The choice of the colloid to be used may be governed by the nature of the product to which the encapsulated flavor is to be added. For example, in gelatin desserts we prefer to use gelatin as the encapsulating substance while for pectin desserts we prefer to use pectin. However, other gums capable of drying to an impervious matrix can obviously be used, the only limiting factors being those of non-toxicity for use in food products, and the ability to form upon drying a hard, flavor impervious matrix. Taking gelatin as an example and assuming the emulsion is dried from both sides simultaneously, we have found that with good case-hardening conditions and with total dry thicknesses of the order of 0.15 inch, ratios of 0.05–0.1 and corresponding flavor yields of 90–95% are obtained. Optimum case-hardening conditions may increase the yield above 95% with dry thicknesses of this order, or on the other hand may largely compensate the effect of decreasing the slab thickness. Thus at dry thicknesses of the order of 0.10 inch, optimum case-hardening conditions result in ratios of the order of 0.2 and corresponding flavor yields of about 80%. It will be apparent, however, that much larger ratios as high as 0.6–0.7 and correspondingly small yields of 30–40% represent an advantage over present commercial practice as mentioned above, despite the substantial loss of flavor under such conditions. Such yields may result from delayed case-hardening even with near optimum dry slab thickness, or conversely from low dry slab thicknesses of the order of 0.02–0.03 inch although case-hardening is accelerated as described above.

It will be understood that if the sheets are dried in pans or trays from one side only instead of from both sides, the ratio of skin thickness to total thickness and the results obtained will be substantially the same with sheets half as thick.

From what has been said above, it will be evident that the colloid concentration is largely a matter of choice insofar as flavor yield is concerned. From the standpoint of drying time, however, higher concentrations are preferred because less water has to be removed from the emulsion during drying. The concentration of colloid in the solution should not be so high as to interfere with emulsification of the flavor or subsequent handling of the emulsion. On the other hand, while the emulsion may be dried in pans or trays, it is preferably formed into self-sustaining sheets so that drying can take place from both sides simultaneously and in such cases the concentration should not be so low that the emulsion cannot be handled as a jelly. The colloidal jelly properties of the emulsion, however, depend not only on the amount of colloid but also on its jelly strength, and since the jelly strength of the colloid does not affect flavor yield, low strength colloids may be used to advantage at high concentrations while conversely high strength colloids may be of advantage at low concentrations. With gelatin of average strength, for example, it is usually undesirable to use concentrations below about 9–10% or above about 50%, and similar practical limits at which equivalent colloidal properties are obtained may be established for other colloids such as pectin.

Processes embodying the present invention are particularly well adapted to the manufacture of concentrated encapsulated flavors which can be used in small amounts as flavors without imparting colloidal characteristics to or altering the colloidal characteristics of the foods to which they are added. Thus, while the amount of flavor to be added to the food is determined by the flavor characteristics desired in the food, the proportion of flavor to colloid in the encapsulated flavor product may be varied as desired provided that the added colloid does not adversely affect the characteristics of the food as pointed out above and that the amount of encapsulated flavor does not become too small to be handled satisfactorily in commercial operations. As an illustration, in flavoring gelatin desserts we prefer to use flavors encapsulated in gelatin in the proportion of about 5 to 100 mg. of encapsulated flavor to each 10 gm. of normal gelatin content or in other words 1% or less by weight of the normal gelatin content. With flavored gelatin such as proposed by the above Epstein patent, on the other hand, the same amount of flavor must be distributed throughout the whole 10 gm. of gelatin at a concentration less than 1/100 as large.

Subject to the above limitations, the proportion of flavor to colloid may vary depending partly on the strength of the particular flavor and partly on other considerations set forth below. As the proportion of flavor to colloid is increased, the amount of encapsulated flavor necessary to be added to a given product to establish the desired flavor level decreases and may ultimately become too small to permit its satisfactory incorporation in the product by commercial mixing procedures. Thus in practice we have found that with very strong flavors used in minute quantities, the proportion of flavor to colloid should be kept low, in some cases as low as 1%, as otherwise the amount of encapsulated flavor becomes too small to be handled satisfactorily in the flavoring of dry materials. With weaker flavors, however, larger quantities of flavor and hence of the encapsulated product are required, and accordingly the concentration may be increased. With very weak flavors it may be as high as 50% or more by weight of the dry product (equal parts of flavor and colloid) without unduly reducing the amount of dry product required, provided of course that the quantity of flavor does not become too great for satisfactory emulsification.

On the other hand, as the proportion of flavor to colloid is decreased, the amount of colloid added to the food product increases and further the amount of emulsion which must be handled and in turn the drying capacity needed for a given amount of flavor may increase to the point where the cost becomes excessive. From this standpoint the concentration of very weak flavors will usually not be less than about 10% by weight of the colloid.

To provide the desired proportion of flavor in the dry product, it is of course necessary to make allowance for the losses during drying, as well as to take into account the practically complete loss of alcohol in the case of flavors added to the colloid solution in alcohol dilution. However, drying losses may readily be determined in any given case according to the ratio of skin thickness to total thickness and allowance made for such losses in determining the amount of flavor to be emulsified in the colloid solution. Further drying losses may occur in the case of those flavors which have appreciable solubility in water, but the proportion of such loss to the total quantity of flavor is too small to affect substantially the correspondence between ratio and yield, provided the flavor is used at concentrations such as mentioned above as discussed hereinafter; some additional loss takes place in comminution which should also be taken into account.

We prefer to express the quantity of flavor in terms of its proportion to the dry colloid since the amount of water in the colloid solution makes little difference as pointed out above. Thus if the desired proportion of flavor to colloid is 25%, and assuming for example a 10% loss in drying and an additional 15% loss in comminution, then the proportion of flavor to colloid in the emulsion should be 33.3%, i. e., 33.3 lbs. of flavor for each 100 lbs. of colloid. Under optimum conditions as set forth above, 90% or more of such original flavor remains encapsulated in the dried matrix, and thus it is possible to obtain consistently and accurately a predetermined high level of flavor in the dry product as well as to provide a final product of standard, substantially unchanging flavoring potency and other characteristics. However, with initially high flavor concentrations suitable high flavor levels in the dry product can still be obtained although the percentage loss of flavor is much greater, and such less efficient operation may be acceptable in some cases since none of the flavor retained in the dried matrix will be lost as compared with the great loss of flavor that takes place during storage and distribution under present conditions described above. Moreover, the flavor removed from the emulsion along with the water can be separated from the water vapor and recovered for re-use by suitable procedures.

It will be evident that the product may be stored in slab form until used, and marketed in slab form as well. Moreover, where the conditions of use permit, the size of the slabs may be regulated so that one or more slabs can be added in slab form to a desired quantity of other materials to be flavored. However, it is usually preferable to add the flavor to the other materials in comminuted form, particularly where package filling and weighing machinery is employed with a large batch or a continuous supply of materials. When the product is to be comminuted, the degree of fineness to which the flavoring substance needs to be broken up and dispersed in the colloid solution before drying depends upon the degree of fineness to which the dry product is to be ground. At their largest the encapsulated flavor droplets must be smaller than particles of the size to which the product is to be ground in order to prevent release of the flavor on grinding. Preferably, however, a large number of droplets should be encapsulated in each particle, because it can be shown mathematically that the finer the dispersed droplets the less flavor will be released upon grinding. On the other hand, if the amount of flavor and the number of such encapsulated droplets are too large, comminution losses increase and may render it economically desirable to recover the lost flavor by solvent washing of the ground material. Hence we prefer that the proportion of flavor to colloid should not exceed 30–40%.

The particle size depends on the use to be made of the product. As a general rule, it is desirable in mixtures of dry powdered materials that the particles all be of substantially the same size in order to facilitate uniform mixing, prevent segregation in the package, and insure uniform solubility. In general, it is preferable that the size of the individual micro-droplets be not greater than about one-tenth that of the particles or granules of the dried matrix. For use in dry food materials of the types referred to above, it is usually desirable to grind the dry matrix to about 40–80 mesh. An 80 mesh particle, for example, is about 0.006 inch in diameter, and with this particle size we have obtained good results with micro-droplets having diameters of about 0.0003 to 0.0004 inch. Under these conditions the amount of flavor released on grinding is not enough to affect substantially the ratio of flavor to colloid in the product, although if desired the released flavor can be recovered by washing the particles with a flavor solvent or in any other suitable way. For example, a dried gelatin matrix in one instance was shown by analysis to contain 21% citral. This product was ground in a Mead mill and the ground material washed with isopropyl alcohol. Approximately 17% of citral was retained in the ground product, the remaining 4% being found in the solvent. 30 mgms. of this product, containing approximately 5.0 mgms. of citral, were sufficient to provide a good lemon flavor in one pint of gelatin dessert, the same flavoring potency being retained after test storage of the dry material for several months under normal commercial conditions.

The practical application and results of the invention are illustrated by the following examples, together with the accompanying illustrative curves, Figs. 1 and 2, and Figs. 3, 4 and 5 which represent a typical dried product as seen under the microscope. It will be noted that in order to avoid duplication and at the same time to present comparative results, these examples have been restricted to benzaldehyde as a typical example of a volatile, water-immiscible flavor and to gelatin as a typical example of a suitable edible, hydrophilic colloid, and that representative benzaldehyde concentrations of 25-35 parts for each 100 parts of gelatin were maintained throughout. It will be understood, however, that these ingredients and concentrations are merely illustrative and in no way limitative, and that equivalent results can be obtained with other flavors and colloids as indicated by the foregoing generic description of the invention.

The same general procedure was followed in making the tests on which Figs. 1 and 2 are based. In each case the mixture of gelatin solution and flavor was passed through a homogenizer to obtain complete emulsification and uniform dispersion of the flavor droplets. The emulsion was then poured into sheets of the desired thickness which were chilled to set the jelly and, where necessary, cut into a suitable number of smaller slabs to provide specimens for analysis at different intervals throughout the drying period. The slabs comprising each lot were then subjected to the prescribed drying conditions, specimen slabs being taken from each lot from time to time and analyzed for benzaldehyde content with the results indicated in the curves.

*Fig. 1*

Curves A, B, C, D and E illustrate the results obtained with different methods of film or skin formation, i. e., "case-hardening." In each case the gelatin solutions (25%) containing the emulsified benzaldehyde were poured into sheets 0.30 inch thick and dried to about 10-11% moisture at which point they had a final dry thickness of approximately 0.09 inch.

The sample illustrated in curve A was dried in still room temperature air of relatively low humidity, the conditions being such that moisture was removed from the surfaces of the slabs more rapidly than it could pass from the interior of the slabs to the surface, and thus a protective dried film or skin was formed around the wet slab after which no further loss occurred. The benzaldehyde loss occurring prior to case-hardening, which was substantially effective in about 24 hours and complete in about 48 hours, was only approximately 27%, and approximately 73% of the benzaldehyde was retained in the dry slabs although a total drying time of about sixty hours was required to complete the operation.

Curves B, C, D and E shows the progressive improvement effected by accelerating case-hardening, the thickness of the slabs remaining the same. By circulating the air at high velocity, the case-hardening period was shortened to about eight hours and the flavor loss during this period was correspondingly reduced to about 11% as shown in curve B, the total drying time again being approximately sixty hours. By heating the current of moving air and thus simultaneously reducing its relative humidity, case-hardening was further accelerated and flavor loss was further reduced to about 7% as shown by curve C, although due to the high temperature case-hardening did not become completely effective until after about eight hours. Thus flavor retention was increased to approximately 93% while at the same time the total drying period was reduced to about eighteen hours. When case-hardening was still further accelerated by dipping the slabs initially in alcohol prior to drying under the same conditions as curve B, flavor retention was further increased to approximately 96% as shown by curve D. Curve E shows the increased flavor retention obtained by applying a preformed film to the slabs, drying conditions again being comparable to those of curve B. Very little time being required to apply the protective film, the percentage loss of flavor was again reduced and flavor retention was increased to about 98%.

Each of the curves A to E, inclusive, shows that regardless of total drying time, flavor loss occurs substantially only during the case-hardening period, the curves thereafter being flat throughout the remainder of the total drying period which, in all of the examples given except curve C, extended for about sixty hours. As explained above, variation in case-hardening conditions results in variation of the thickness of the surface layer or skin, and curves A to E inclusive illustrate the effect of such variations of skin thickness on flavor loss inasmuch as the dry slab thickness was maintained constant throughout. They show that the slab thickness was less than optimum, which tended to increase the ratio of skin thickness to total thickness, but that the compensating effect of reducing skin thickness by accelerating case-hardening nevertheless produced very high flavor yields.

*Fig. 2*

The results tabulated below and represented graphically in Fig. 2 show that the loss of flavor, and conversely the flavor yield or proportion of flavor retained in the dry slabs or sheets, depend directly on the ratio of total skin thickness to total sheet thickness. The curve itself represents graphically the theoretical relation between this ratio and flavor retention or yield, and the points plotted in the figure represent this relation as determined by the tests shown in the following table at varying dry sheet thicknesses and with various methods of case-hardening resulting in varying film or skin thicknesses. It will be understood that since the sheets were dried from both sides simultaneously, the skin on both surfaces is included in the determination of the ratio. The skin thickness and total thickness were readily determined microscopically by the use of a micrometer slide in the microscope.

Relation of $\frac{\text{Film thickness}}{\text{Slab thickness}}$ ratio to Flavor retention

|  | Gelatin concentration | A dry slab thickness | B Film thickness | Ratio B/A | Flavor retention | |
|---|---|---|---|---|---|---|
|  |  |  |  |  | Calculated | Determined |
|  | Per cent | Inches | x2 |  | Per cent | Per cent |
| 1 | 25 | 0.195 | 0.018 | 0.092 | 90.8 | 89 |
| 2 | 25 | 0.184 | 0.0266 | 0.144 | 85.6 | 84 |
| 3 | 25 | 0.180 | 0.0266 | 0.148 | 85.2 | 84.5 |
| 4 | 25 | 0.188 | 0.026 | 0.138 | 86.2 | 87.7 |
| 5 | 25 | 0.130 | 0.006 | 0.046 | 95.4 | 91.6 |
| 6 | 14 | 0.150 | 0.0155 | 0.103 | 90.7 | 89.5 |
| 7 | 14 | 0.094 | 0.0124 | 0.132 | 86.8 | 87.3 |
| 8 | 13 | 0.056 | 0.0347 | 0.620 | 38.0 | 37 |
| 9 | 13 | 0.0646 | 0.0446 | 0.693 | 30.7 | 30 |
| 10 | 14 | 0.0184 | 0.0074 | 0.401 | 59.9 | 47.5 |
| 11 | 14 | 0.0392 | 0.008 | 0.204 | 79.6 | 72 |
| 12 | 14 | 0.0482 | 0.0088 | 0.181 | 81.9 | 83.7 |
| 13 | 14 | 0.073 | 0.0083 | 0.113 | 88.7 | 88.5 |
| 14 | 14 | 0.092 | 0.0080 | 0.087 | 91.3 | 89.5 |
| 15 | 14 | 0.103 | 0.0070 | 0.068 | 93.2 | 93.5 |

The close correspondence between the tabulated results and the theoretical curve is shown by Fig. 2. It is evident that over the entire range of ratios up to 0.7, the value of the ratio at any particular point is a direct indication of the amount of flavor loss or conversely of the amount of flavor retained in the dry sheets.

Moreover, the tabulated data shows the effects on the ratio of variations in the two variables of the ratio, as well as the fact that proper control of these variables renders gelatin concentration immaterial insofar as flavor yield is concerned. Thus substantially the same yields are obtained with the same ratios regardless of gelatin concentration (compare items 1-5 with items 13-15). With low skin thicknesses, thinner sheets may be employed and low ratios yet obtained, while at greater skin thicknesses thicker sheets are required to obtain the same low ratios and correspondingly high yields (compare items 12-15 with items 1-4). Hence where feasible, accelerated case-hardening is to be preferred since the dry sheet thickness and consequently the total drying time can thus be reduced without loss of efficiency. Conversely where case-hardening is delayed, the dry sheet thickness must be increased at the expense of increased drying time if the efficiency of the drying operation is to be maintained.

Figure 5:
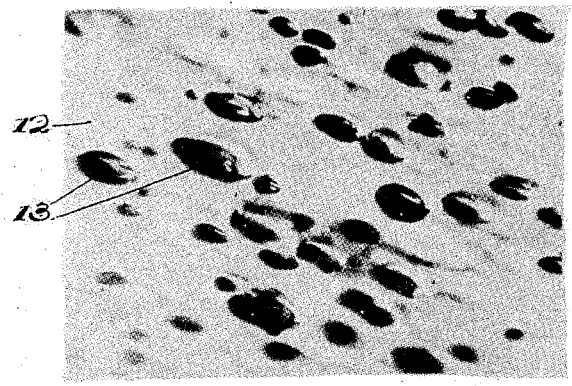

Figs. 3, 4 and 5 represent the appearance of a cross section of a typical dried product under the microscope, Fig. 3 showing a section of the entire slab at a magnification of 24.5 diameters, Fig. 4 showing at a magnification of 195 diameters the structure of the slab within the area X of Fig. 3, and Fig. 5 showing at a magnification of 1150 diameters the structure of the slab within the area Y of Fig. 3. This product was prepared under substantially the same conditions as those of curve B of Fig. 1. The protective skin or film comprising the dried outer surfaces of the emulsion is clearly shown at 10 in Figs. 3 and 4. It comprises a smooth, solid layer of dried gelatin from which practically all of the flavor has been lost during case-hardening but which is very thin as compared to the total slab thickness. Underneath this skin, however, the gelatin has dried to a spongy structure 11 encapsulating a multitude of very small discrete droplets of flavor. The flattening out of the curves of Fig. 1 at the end of the case-hardening period and the cessation of flavor loss at these points are evidenced by the sharp line of division between the outer protective skin 10 and the inner spongy structure 11. The ratio of skin thickness (including both surfaces) to the total slab thickness is approximately 0.06, as can be determined by inspection of the figure, at which ratio the yield is approximately 94% as shown by Fig. 2.

The magnification of Fig. 5 is sufficient that it may be taken as a typical microscopic view of part of a cross section through one of the particles or granules into which the dried slab of Fig. 3 is ground for incorporation in a food product. This view clearly shows the dry solid matrix 12 as having a structure similar to that of the protective film 10 but containing the encapsulated microdroplets 13 of flavor. Although of varying size, these droplets instead of being spherical have a characteristic flattened shape indicating that instead of volatilizing and escaping with the water during drying of the matrix, the flavor has been retained so effectively that the shrinkage of the matrix during drying has squeezed the microdroplets out of spherical shape.

It is apparent that in practice the materials may be handled in many different ways. When small quantities are involved, it may be desirable merely to pour the emulsion into pans or trays to the desired depth and to dry it in this form. It is usually desirable, however, to dry the emulsion from both sides in the form of sheets or slabs as indicated above. Large quantity production may be facilitated by forming the emulsion into long strips or ribbons of the desired width and thickness, as by flowing it onto moving belts, etc. Whenever necessary, the emulsion may be chilled to render it self-sustaining for convenient handling. The slabs, sheets, or ribbons may have preformed membranes applied to their surfaces in any suitable manner, or they may be sprayed with or dipped in dehydrating or coagulating baths such as ethyl or isopropyl alcohol, aluminum chloride, etc., and they may be dried by any of the methods indicated above and in any suitable apparatus, the conditions preferably being such as to accomplish case-hardening as promptly as may be practicable.

When desired, flavor diluents such as alcohol and so-called "volatility restrainers" such as coconut oil can be mixed with the flavor, and antioxidants which do not objectionably influence flavor can be used, without affecting the results discussed above. Also the dried slabs or powder can be coated with suitable materials to increase the protection of the flavor during prolonged storage, such as polyvinyl alcohol which is substantially impervious to oxygen.

The following additional examples are given as specific illustrations of details of procedure which have given good results, gelatin desserts being taken as a convenient medium for illustration.

*Example 1.—Lime oil encapsulated in gelatin*

100 grams of gelatin powder were dissolved in 400 grams of water to give a 20% gelatin solution. After cooling to about 105–110° F., 25 ccs. of lime oil were added slowly while stirring the gelatin solution with a mechanical mixer, and a fine dispersion of the oil within the gelatin was then obtained by colloid milling or a hand-homogenizer. The emulsion was poured onto trays to a thickness of ⅜ in., cooled to cause setting and then dried at room temperature on a tray dryer. When brittle, it was ground to a suitable mesh and incorporated with other customary ingredients necessary to make a gelatin dessert powder. For purposes of comparison, several gelatin dessert mixtures were prepared using a suitable amount of the encapsulated flavor, and at the same time a number of otherwise identical dessert mixtures were prepared with identical amounts of the original free lime oil added in the usual manner by mixing with the dry ingredients. The following comparisons were made after storage in paper cartons at 100° F. and 35% relative humidity:

| Storage time | Encapsulated product | Flavor of dessert after storage | |
|---|---|---|---|
| | | Flavor | Control product |
| None | Stronger than | Control | Good flavor. |
| 4 weeks | Very strong | | No flavor. |
| 7 weeks | do | | Do. |

*Example 2.—Benzaldehyde encapsulated in gelatin*

300 gallons of clarified gelatin extract containing 27.16% of pigskin gelatin of 170 Bloom test were held at 105° F. in a mixing tank fitted with a rapid stirring device. 284 lbs. of oil of bitter almonds (97% benzaledhyde) were run in through a tube extending below the surface of the gelatin solution while the latter was stirred rapidly. This addition required 20 minutes, subsequent to which the approximately 330 gallons of mixture were passed through a Manton-Gaulin 2-stage homogenizer at 2000 lbs. pressure per sq. in. and then deposited to a depth of 0.30–0.40 in. on a cooling belt. The sheet of gelatin-flavor mix was cooled at 24° F. and cut into 3-inch wide strips which were placed on wire nets in racks and dried in a drying tunnel at a temperature ranging from 82° F. and 118° F. The drying was continued until the moisture content had been reduced to about 9–11% at which time a hard, brittle product similar in appearance to ordinary sheet dried gelatin, but somewhat opaque, was obtained.

When observed under the microscope the dried strips were found to contain innumerable droplets of benzaldehyde shaped as slightly flattened spheres having diameters of approximately 0.0004 to 0.0003 inch. By chemical analysis the product was found to contain 22.3% benzaldehyde which was calculated to be a yield of 89% of the total added.

A portion of this product was ground to 60–80 mesh size granules and used to flavor gelatin dessert powders. These were found to retain a desirable flavor level for months after a similar product flavored in the usual manner with the original free oil of bitter almond had lost every vestige of flavor.

*Example 3.—Benzaldehyde encapsulated in gelatin*

A 9% gelatin solution was made up and benzaldehyde added as in the previous example in the proportion of 35 parts by weight to 100 parts of gelatin. The mixture was then homogenized and deposited to a depth of about 1.125 inches on a cooling belt. The slabs were first treated with alcohol and then dried under conditions similar to curve B of Fig. 1 to a moisture content of about 10%, the slabs having a dry thickness of about 0.120 inch. On analysis, it was found that 67% of the original benzaldehyde content was retained in the dry slabs.

In the practice of our invention it may be desirable to regulate the solubility of the matrix substance by chemically treating it in various ways. For example, in the process of encapsulating volatile substances in pectin we may regulate the solubility of the pectin by the addition of a suitable proportion of calcium. We may also modify the properties of the matrix substance by changing its properties by chemical reactions or the action of enzymes. For instance, we may modify the properties of gelatin with respect to solubility in water by hydrolyzing it with proteolytic enzymes or by the action of acids. As another example we may choose to modify the properties of pectin by a process of demethoxylation thus rendering the pectin more precipitable and therefore less soluble in the presence of calcium ions.

The foregoing description and examples set forth the optimum conditions for flavor retention which must be weighed against considerations such as cost of materials and operation in order to determine the most efficient and economical operation in any particular case. For example, the increase in flavor retention effected by increased slab thickness may be outweighed in some cases by the increased cost of greater drying time in which event a yield less than optimum may be preferred. On the other hand, where the use of the invention under optimum conditions might involve too much new equipment or modification of existing equipment, established procedures, technic, etc., the advantages of the invention may nevertheless be realized to a large extent with flavor retention much less than optimum, since in present commercial practice as explained above it is often necessary to allow for the loss of as much as 75–90% of the flavor of some types of food products during storage and distribution. Thus many variations of the specific examples given above will readily be apparent to those skilled in the art without departing from the spirit of the invention, and reference should be had to the appended claims for a definition of the limits of the invention.

What is claimed is:

1. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the amount of said substance being proportioned to the amount of colloid in said solution to provide a dry product adapted for addition to foods in relatively small amounts as a concentrated flavor, forming said emulsion into sheets for drying, establishing surface membranes on said sheets which are pervious to moisture vapor but impervious to said substance to prevent loss of flavor in drying except from the surface portions of said sheets before said membranes are established, proportioning the wet thickness of said sheets in inversely varying relation to the concentration of said colloid in said solution and in coordination with the thickness of said surface portions to provide ratios of dry thickness of said surface portions to total dry sheet thickness of less than 0.7, and drying said emulsion to form a dry colloid matrix containing separately encapsulated, discrete droplets of said substance.

2. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the concentration of colloid in said solution being sufficient to form self-sustaining sheets of emulsion and the amount of said substance being proportioned to the amount of colloid to provide a dry product adapted for addition to foods in relatively small amounts as a concentrated flavor, forming said emulsion into self-sustaining sheets for drying, establishing membranes on opposite surfaces of said sheets which are pervious to moisture vapor but impervious to said substance to prevent loss of flavor in drying except from the surface portions of said sheets before said membranes are established, proportioning the wet thickness of said sheets in inversely varying relation to said colloid concentration and in coordination with the thickness of said surface portions to provide ratios of dry thickness of said surface portions on both sides of said sheets to total dry sheet thickness of less than 0.7, and drying said sheets from both sides to form a dry colloid matrix containing separately encapsulated, discrete droplets of said substance.

3. The method defined in claim 1, in which the dried sheets are comminuted to an extent providing a granular product the individual particles of which each contain a plurality of separately encapsulated, discrete droplets of said substance.

4. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the amount of said substance being proportioned to the amount of colloid in said solution to provide a dry product adapted for addition to foods in relatively small amounts as a concentrated flavor, forming said emulsion into sheets for drying, applying membranes to the surfaces of said sheets which are pervious to moisture vapor but impervious to said substance to prevent loss of flavor in drying except from the surface portions of said sheets before said membranes are applied, proportioning the wet thickness of said sheets in inversely varying relation to the concentration of said colloid in said solution and in coordination with the thickness of said surface portions to provide ratios of dry thickness of said surface portions to total dry sheet thickness of less than 0.7, and drying said emulsion to form a dry colloid matrix containing separately encapsulated, discrete droplets of said substance.

5. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the amount of said substance being proportioned to the amount of colloid in said solution to provide a dry product adapted for addition to foods in relatively small amounts as a concentrated flavor, forming said emulsion into sheets for drying, dehydrating the surface portions of said sheets to establish substantially dry surface membranes of said colloid and to prevent loss of flavor in drying except from said surface portions, proportioning the wet thickness of said sheets in inversely varying relation to the concentration of said colloid in said solution and in coordination with the thickness of said surface portions to provide ratios of dry thickness of said surface portions to total dry sheet thickness of less than 0.7, and drying said emulsion to form a dry colloid matrix containing separately encapsulated, discrete droplets of said substance.

6. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the amount of said substance being proportioned to the amount of colloid in said solution to provide a dry product adapted for addition to foods in relatively small amounts as a concentrated flavor, forming said emulsion into sheets for drying, treating the surfaces of said sheets with liquid dehydrating agents to establish substantially dry surface membranes of said colloid and to prevent loss of flavor in drying except from the surface portions of said sheets, proportioning the wet thickness of said sheets in inversely varying relation to the concentration of said colloid in said solution and in coordination with the thickness of said surface portions to provide ratios of dry thickness of said surface portions to total dry sheet thickness of less than 0.7, and drying said emulsion to form a dry colloid matrix containing separately encapsulated, discrete droplets of said substance.

7. The method of preparing a volatile, water-immiscible flavoring substance in dry stable form which comprises the steps of emulsifying and dispersing said substance in the form of discrete minute droplets throughout an aqueous solution of an edible hydrophilic colloid which when dried is impervious to said substance, the amount of said substance being proportioned to the amount of colloid in said solution to provide a dry product adapted for addition to foods in relatively small amounts as a concentrated flavor, forming said emulsion into sheets for drying, subjecting said sheets to drying air having its temperature, humidity and amount correlated to establish substantially dry surface portions of said colloid before the enclosed body of emulsion is dried and to prevent loss of flavor in drying except from said surface portions, proportioning the wet thickness of said sheets in inversely varying relation to the concentration of said colloid in said solution and in coordination with the thickness of said surface portions to provide ratios of dry thickness of said surface portions to total dry sheet thickness of less than 0.7, and drying said emulsion to form a dry colloid matrix containing separately encapsulated, discrete droplets of said substance.

8. The method of encapsulating a volatile, water-immiscible flavoring substance in a dry gelatin matrix which comprises the steps of emulsifying and dispersing said substance in the form of discrete minute droplets throughout an aqueous gelatin solution, the amount of said substance being proportioned to the amount of gelatin in said solution to provide a dry product adapted for addition to foods in relatively small amounts as a concentrated flavor, forming said emulsion into sheets for drying, dehydrating the surface portions of said sheets to establish substantially dry surface membranes of gelatin and to prevent loss of flavor in drying except from said surface portions, proportioning the wet thickness of said sheets in inversely varying relation to the concentration of gelatin in said solution and in coordination with the thickness of said surface portions to provide ratios of dry thickness of said surface portions to total dry sheet thickness of less than 0.7, and drying said sheets to form a dry gelatin matrix containing separately encapsulated, discrete droplets of said substance.

9. The method defined in claim 8, in which the dried sheets are comminuted to an extent providing a granular product the individual particles of which each contain a plurality of separately encapsulated, discrete droplets of said substance.

10. The method of encapsulating a volatile, water-immiscible flavoring substance in a dry gelatin matrix which comprises the steps of emulsifying and dispersing said substance in the form of discrete minute droplets throughout an aqueous gelatin solution, the concentration of gelatin in said solution being sufficient to form self-sustaining sheets of emulsion and the amount of said substance being proportioned to the amount of gelatin to provide a dry product adapted for addition to foods in relatively small amounts as a concentrated flavor, forming said emulsion into self-sustaining sheets for drying, dehydrating the surface portions on both sides of said sheets to establish substantially dry surface membranes of gelatin and to prevent loss of flavor in drying except from said surface portions, proportioning the wet thickness of said sheets in inversely varying relation to said gelatin concentration and in coordination with the thickness of said surface portions to provide ratios of dry thickness of said surface portions on both sides of said sheets to total dry sheet thickness of less than 0.7, and drying said sheets from both sides to form a dry gelatin matrix containing separately encapsulated, discrete droplets of said substance.

11. The method of encapsulating a volatile, water-immiscible flavoring substance in a dry gelatin matrix which comprises the steps of emulsifying and dispersing said substance in the form of discrete minute droplets throughout an aqueous gelatin solution, the concentration of gelatin in said solution being within the approximate limits of 10% and 50% and the amount of said substance being not less than 1% by weight of the dry gelatin, forming said emulsion into sheets for drying, dehydrating the surface portions of said sheets to establish substantially dry surface membranes of gelatin and to prevent loss of flavor in drying except from said surface portions, proportioning the wet thickness of said sheets in inversely varying relation to said gelatin concentration and in coordination with the thickness of said surface portions to provide ratios of dry thickness of said surface portions to total dry sheet thickness of less than 0.7, and drying said sheets to provide a dry gelatin matrix containing separately encapsulated, discrete droplets of said substance.

12. The method of encapsulating a volatile, water-immiscible flavoring substance in a dry gelatin matrix which comprises the steps of emulsifying and dispersing said substance in the form of discrete minute droplets throughout an aqueous gelatin solution, the amount of said substance being proportioned to the amount of gelatin in said solution to provide a dry product adapted for addition to foods in relatively small amounts as a concentrated flavor, forming said emulsion into sheets for drying, treating the surfaces of said sheets with liquid dehydrating agents to establish substantially dry surface membranes of gelatin and to prevent loss of flavor in drying except from the surface portions of said sheets, proportioning the wet thickness of said sheets in inversely varying relation to the concentration of gelatin in said solution and in coordination with the thickness of said surface portions to provide ratios of dry thickness of said surface portions to total dry sheet thickness of less than 0.7, and drying said sheets to form a dry gelatin matrix containing separately encapsulated, discrete droplets of said substance.

13. The method of encapsulating a volatile, water-immiscible flavoring substance in a dry gelatin matrix which comprises the steps of emulsifying and dispersing said substance in the form of discrete minute droplets throughout an aqueous gelatin solution, the amount of said substance being proportioned to the amount of gelatin in said solution to provide a dry product adapted for addition to foods in relatively small amounts as a concentrated flavor, forming said emulsion into sheets for drying, subjecting said sheets to drying air having its temperature, humidity and amount correlated to establish substantially dry surface portions of gelatin before the enclosed body of emulsion is dried and to prevent loss of flavor in drying except from said surface portions, proportioning the wet thickness of said sheets in inversely varying relation to the concentration of gelatin in said solution and in coordination with the thickness of said surface portions to provide ratios of dry thickness of said surface portions to total dry sheet thickness of less than 0.7, and drying said sheets to form a dry gelatin matrix containing separately encapsulated, discrete droplets of said substance.

14. The method of encapsulating a volatile, water-immiscible flavoring substance in a dry gelatin matrix which comprises the steps of emulsifying and dispersing said substance in the form of discrete minute droplets throughout an aqueous gelatin solution, the concentration of gelatin in said solution being within the approximate limits of 10% and 50% and the amount of said substance being not less than 1% by weight of the dry gelatin, forming said emulsion into sheets for drying, dehydrating the surface portions of said sheets to establish substantially dry surface membranes of gelatin and to prevent loss of flavor in drying except from said surface portions, proportioning the wet thickness of said sheets in inversely varying relation to said gelatin concentration to provide dry sheet thicknesses of the order of 0.10–0.15 inch and coordinating said dry sheet thickness and the dry thicknesses of said surface portions to provide ratios of dry thickness of surface portions to total dry sheet thickness of the order of 0.05–0.2, and drying said sheets to form a dry gelatin matrix containing separately encapsulated, discrete droplets of said substance.

AKSEL G. OLSEN.
EDWARD SELTZER.